(12) United States Patent
Kim et al.

(10) Patent No.: US 10,506,660 B2
(45) Date of Patent: Dec. 10, 2019

(54) METHOD FOR TRANSMITTING AND RECEIVING SIGNALS RELATED TO PDN CONNECTION RECOVERY IN WIRELESS COMMUNICATION SYSTEM, AND DEVICE THEREFOR

(71) Applicant: LG ELECTRONICS INC., Seoul (KR)

(72) Inventors: Laeyoung Kim, Seoul (KR); Jinsook Ryu, Seoul (KR); Hyunsook Kim, Seoul (KR); Jaehyun Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 15/542,594

(22) PCT Filed: Jan. 11, 2016

(86) PCT No.: PCT/KR2016/000237
§ 371 (c)(1),
(2) Date: Jul. 10, 2017

(87) PCT Pub. No.: WO2016/111603
PCT Pub. Date: Jul. 14, 2016

(65) Prior Publication Data
US 2018/0270891 A1    Sep. 20, 2018

Related U.S. Application Data

(60) Provisional application No. 62/102,089, filed on Jan. 11, 2015, provisional application No. 62/119,241, (Continued)

(51) Int. Cl.
*H04L 29/12* (2006.01)
*H04W 76/19* (2018.01)
(Continued)

(52) U.S. Cl.
CPC ......... *H04W 76/19* (2018.02); *H04L 61/3075* (2013.01); *H04N 21/6583* (2013.01);
(Continued)

(58) Field of Classification Search
CPC ........... H04L 29/12735; H04L 61/3075; H04L 49/55; H04L 49/557; H04N 21/6583
See application file for complete search history.

(56) References Cited

U.S. PATENT DOCUMENTS

2012/0269167 A1* 10/2012 Velev ................ H04W 36/0011
  370/331
2013/0128777 A1* 5/2013 Garcia Azorero ...... H04W 4/70
  370/259
(Continued)

FOREIGN PATENT DOCUMENTS

| KR | 10-2014-0055612 A | 5/2014 |
| WO | WO 2011/122808 A2 | 10/2011 |
| WO | WO 2014/026800 A1 | 2/2014 |

OTHER PUBLICATIONS

3GPP, "3rd Generation Partnership Project; Technical Specification Group Services and System Aspects; Architecture enhancements for non-3GPP accesses (Release 13)," 3GPP TS 23.402 v.13.0.0, Dec. 2014, pp. 1-290 (Year: 2014).*
(Continued)

*Primary Examiner* — Salvador E Rivas
(74) *Attorney, Agent, or Firm* — Birch, Stewart, Kolasch & Birch, LLP

(57) ABSTRACT

One embodiment of the present invention relates to a method for transmitting and receiving signals related to connection recovery of packet data network (PDN) of a home subscriber server (HSS) in a wireless communication system, the method comprising: a step of acknowledging, by the HSS, that an obstacle is generated in the PDN connection with regard to an access point name (APN); a step of
(Continued)

determining whether to change the information related to the PDN type of the PDN connection with regard to the APN; and a step of transmitting the changed information related to the PDN type of the PDN connection with regard to the APN to a mobility management entity (MME), in the event that the information related to the PDN type is changed.

14 Claims, 10 Drawing Sheets

Related U.S. Application Data filed on Feb. 22, 2015, provisional application No. 62/138,960, filed on Mar. 26, 2015, provisional application No. 62/139,773, filed on Mar. 29, 2015, provisional application No. 62/152,046, filed on Apr. 24, 2015.

(51) Int. Cl.

| | | |
|---|---|---|
| *H04N 21/6583* | (2011.01) | |
| *H04W 24/04* | (2009.01) | |
| *H04W 36/00* | (2009.01) | |
| *H04W 8/04* | (2009.01) | |
| *H04W 60/06* | (2009.01) | |
| *H04W 76/27* | (2018.01) | |
| *H04W 84/04* | (2009.01) | |
| *H04W 88/16* | (2009.01) | |

(52) U.S. Cl.
CPC ....... *H04W 24/04* (2013.01); *H04W 36/0022* (2013.01); *H04W 8/04* (2013.01); *H04W 60/06* (2013.01); *H04W 76/27* (2018.02); *H04W 84/045* (2013.01); *H04W 88/16* (2013.01)

(56) References Cited

U.S. PATENT DOCUMENTS

| | | | | |
|---|---|---|---|---|
| 2014/0248869 | A1* | 9/2014 | Chen | H04W 8/30 455/424 |
| 2014/0293882 | A1* | 10/2014 | Choi | H04W 76/22 370/329 |
| 2015/0156093 | A1* | 6/2015 | Li | G06F 11/079 714/37 |
| 2016/0119347 | A1* | 4/2016 | Liu | H04W 12/06 370/331 |
| 2016/0165518 | A1* | 6/2016 | Keller | H04L 65/1016 455/450 |

OTHER PUBLICATIONS

3GPP, "3rd Generation Partnership Project; Technical Specification Group Core Network and Terminals; IMS Restoration Procedures (Release 12)," 3GPP TS 23.380, V12.0.0, Sep. 2014, pp. 1-30.

NTT DOCOMO et al., "Discussion of Group-Specific Congestion Control," SA WG2 Meeting #103, S2-141771, Phoenix, Arizona, USA, May 19-23, 2014, pp. 1-5.

\* cited by examiner

METHOD FOR TRANSMITTING AND RECEIVING SIGNALS RELATED TO PDN CONNECTION RECOVERY IN WIRELESS COMMUNICATION SYSTEM, AND DEVICE THEREFOR

TECHNICAL FIELD

Following description relates to a wireless communication system, and more particularly, to a method of transmitting and receiving a signal related to PDN connection recovery and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Task

A technical task of the present invention is to provide a method of transmitting and receiving a signal related to more efficient and faster PDN connection recovery.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving a signal related to PDN (Packet Data Network) connection recovery, which is transmitted and received by a HSS (Home Subscriber Server) in a wireless communication system, includes the steps of recognizing a failure occurred at a PDN connection for an APN (Access Point Name), determining whether to change PDN type-related information of the PDN connection for the APN, and if the PDN type-related information is changed, transmitting the changed PDN type-related information of the PDN connection for the APN to an MME (Mobility Management Entity).

The method can further include the step of requesting PDN type-related information of a PDN connection for an APN to be generated.

The request of the PDN type-related information can be transmitted to the MME in a manner of being included in Update Location Ack.

The method can further include the step of receiving the generated PDN type-related information of the PDN connection for the APN from the MME.

The generated PDN type-related information of the PDN connection for the APN can be included in a Notify request.

The PDN type-related information of the PDN connection for the APN may correspond to either a PDN type of PDN connection or a preferred PDN type.

If IMS deregistration is received due to occurrence of an MO (mobile originating) call, the HSS can determine to recover the PDN connection for a UE, which has generated the MO call.

If Location info request is received due to occurrence of an MT (mobile terminating) call, the HSS can determine to recover the PDN connection for a UE corresponding to a target of the MT call.

If the PDN type of the PDN connection for the APN at which the failure occurs corresponds to IPv6, the changed PDN type of the PDN connection for the APN may correspond to IPv4.

To further achieve these and other advantages and in accordance with the purpose of the present invention, according to a different embodiment, a method of transmitting and receiving a signal related to PDN (Packet Data Network) connection recovery, which is transmitted and received by an MME (Mobility Management Entity) in a wireless communication system, includes the steps of receiving changed PDN type-related information of a PDN connection for an APN from a HSS (Home Subscriber Server), which has recognized a failure occurred at the PDN connection for the APN (Access Point Name), and reconfiguring a PDN connection corresponding to the changed PDN type-related information of the PDN connection of the APN.

If the reconfigured PDN connection corresponds to the last PDN connection, the MME can perform an MME-initiated Detach procedure.

The MME-initiated Detach procedure can indicate a UE to perform re-attach after detach is performed.

If the reconfigured PDN connection does not correspond to the last PDN connection, the MME can perform an MME requested PDN disconnection procedure.

The MME requested PDN disconnection procedure can ask the UE to reactivate a PDN connection for the same APN after PDN disconnection is performed.

Advantageous Effects

According to the present invention, when a failure occurs on a specific IP network, it is able to efficiently provide a service by effectively recovering a PDN without changing an S-GW/P-GW and a UE, thereby enhancing user experience.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
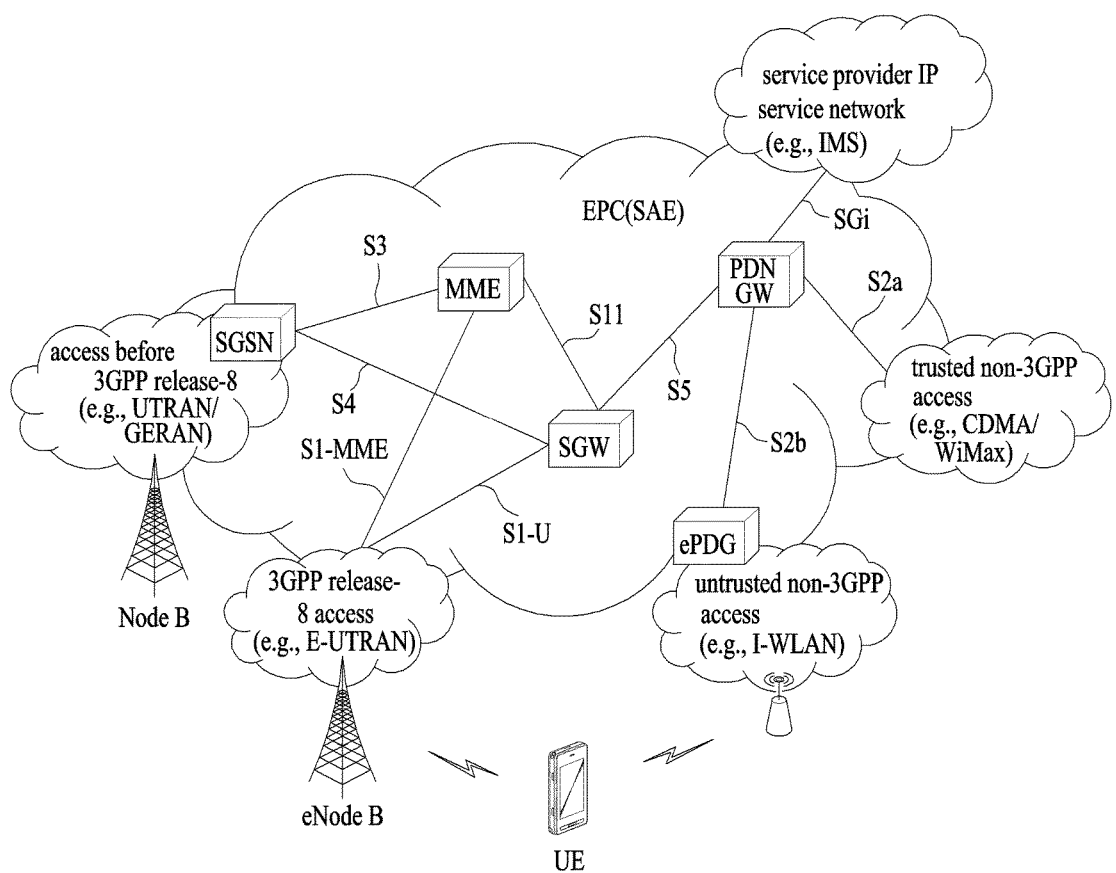
FIG. 1 is a schematic diagram for an EPS (Evolved Packet System) including an EPC (Evolved Packet Core)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP(SUPL Location Platform): entity that controls Location Service Management and Position Determination. The SLP includes SLC(SUPL Location Center) function and SPC(SUPL Positioning Center) function. Details of the SLP will be understood with reference to Open Mobile Alliance(OMA) standard document OMA AD SUPL: "Secure User Plane Location Architecture".

USD(User Service Description): application/service layer transmits USD, which includes TMGI(Temporary Mobile Group Identity) for each MBMS service, start and end time of session, frequencies, and MBMS service area identities(MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: Group communication service providing capability capable of processing fast configuration time and massive group, robust security, and priority handling.

MCPTT service: provides fast configuration time, high availability and reliability, and priority handling using Push To Talk communication supporting applications for mission critical organizations and mission critical applications for organizations (e.g., utilities, railways) with other business.

Mission Critical Organization: includes end-user organization including MCPTT users and UEs and MCPTT administrators. The mission critical organization can be hierarchically organized with an administrative control delegated to the organization or an external entity.

MCPTT system: A set of applications, services, and enabling capabilities required to support Mission Critical Push To Talk for Mission Critical Organization.

MCPTT user: A user of MCPTT service. A user having a device (i.e., UE) capable of participating in MCPTT service.

MCPTT Group: A set of MCPTT users capable of being identified irrespective of (independently) transport or network type.

MCPTT Group Member: MCPTT user authorized for participating in group communication of a specific MCPTT group.

Group call: A mechanism that enables MCPTT user to make other users corresponding to members of MCPTT group(s) perform one-to-many MCPTT transmission.

Group affiliation: A mechanism that makes MCPTT user determine to be interested in one or more MCPTT groups.

Affiliated MCPTT Group Member: MCTPP group member ready to receive group communication from corresponding MCTPP group and/or perform transmission to corresponding MCPTT group by showing interest to a certain MCTPP group.

Late call entry: Join MCPTT Group Call in which Affiliated MCPTT Group Member is in progress.

Floor control: Arbitrating system in MCPTT service that determines who has authority for performing transmission (talk) at certain timing while MCPTT call is in progress.

On-network MCPTT service: A set of function and capability for providing MCPTT via EPS bearer using E-UTRAN. In this case, MCPTT service is provided via network.

Off-Network MCPTT Service: A set of function and capability for providing ProSe discovery between UEs using E-UTRA and providing MCPTT via ProSe communication.

Besides, for MCPTT-related terminologies, it may refer to Definitions of the paragraph 3.1 of 3GPP TS 22.179 and Definitions of the paragraph 3.1 of TS 23.179.

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |

TABLE 1-continued

| Reference point | Description |
| --- | --- |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
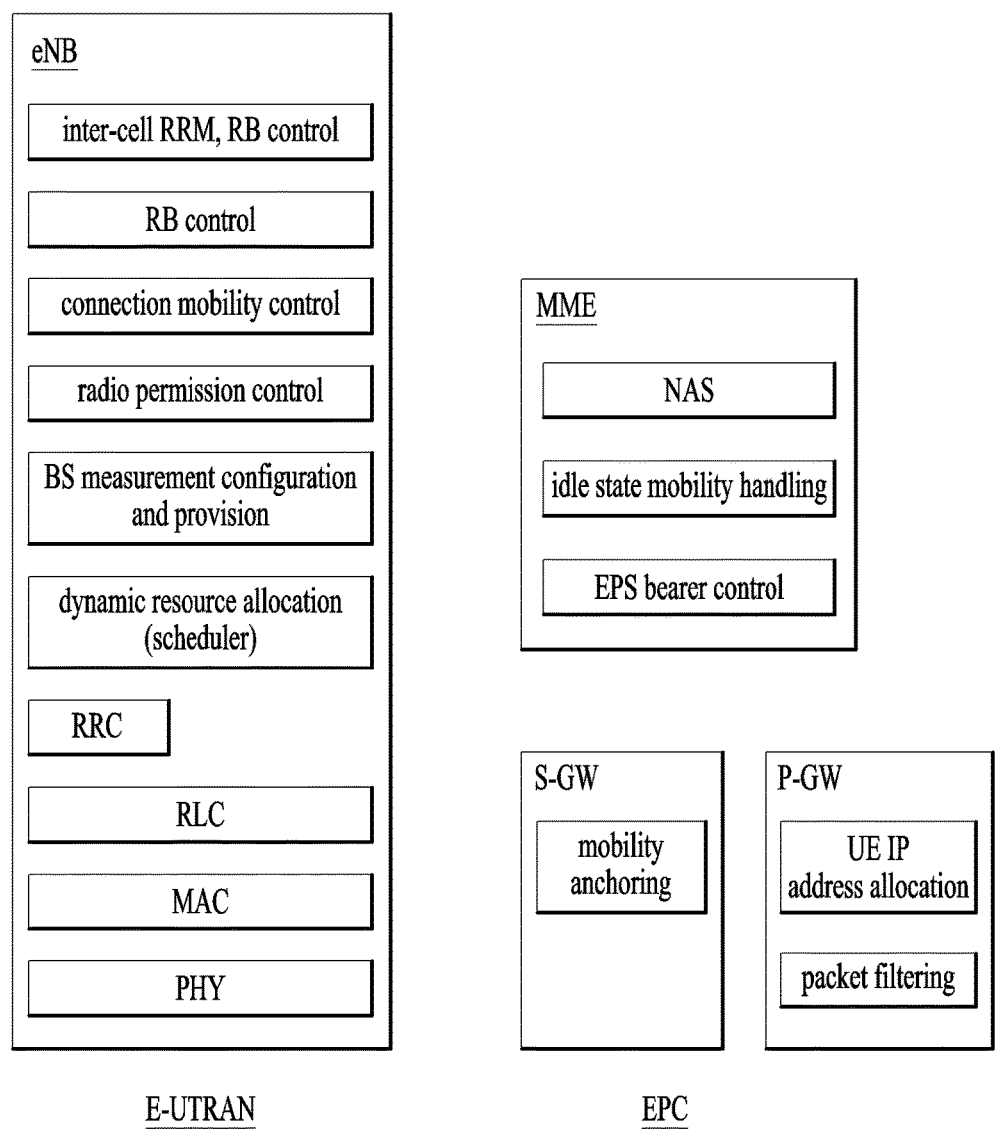
FIG. 2 is a diagram illustrating general architectures of E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
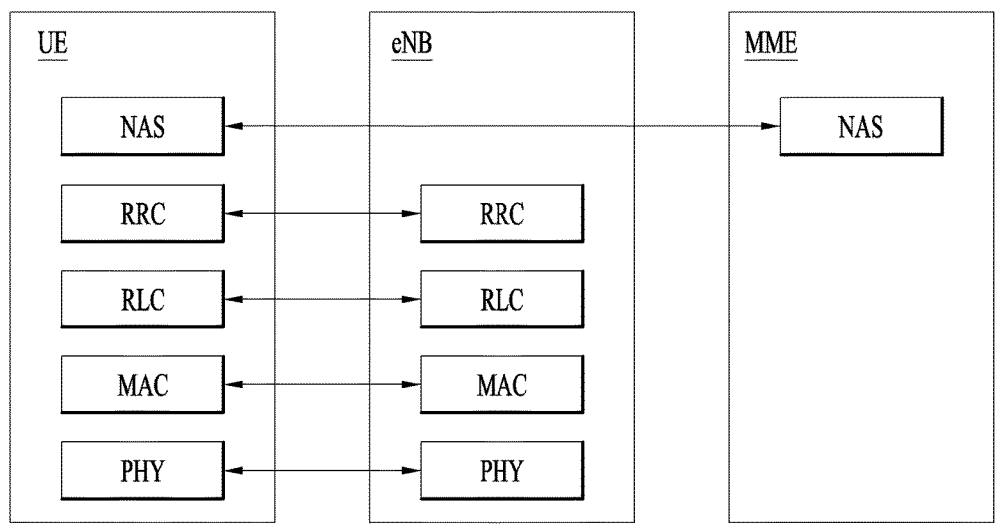
FIG. 3 is a diagram illustrating a structure of a radio interface protocol in a control plane.
Figure 4:
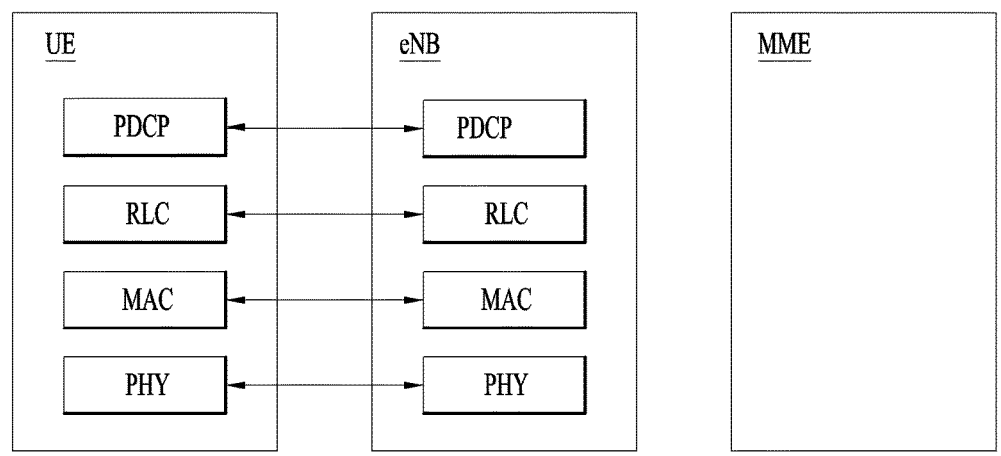
FIG. 4 is a diagram illustrating a structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
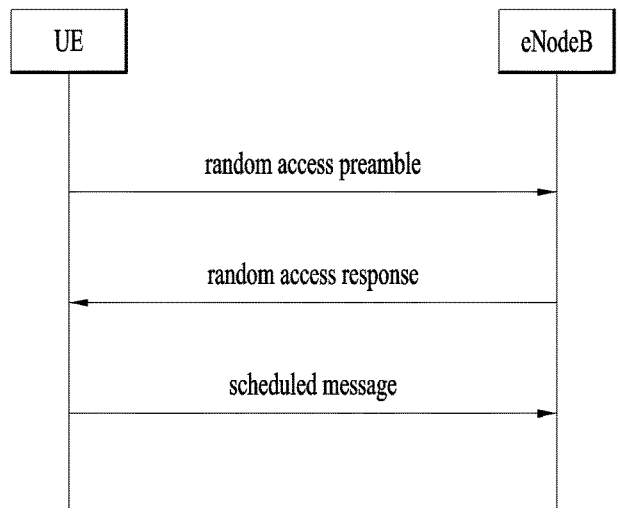
FIG. 5 is a flowchart for explaining a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
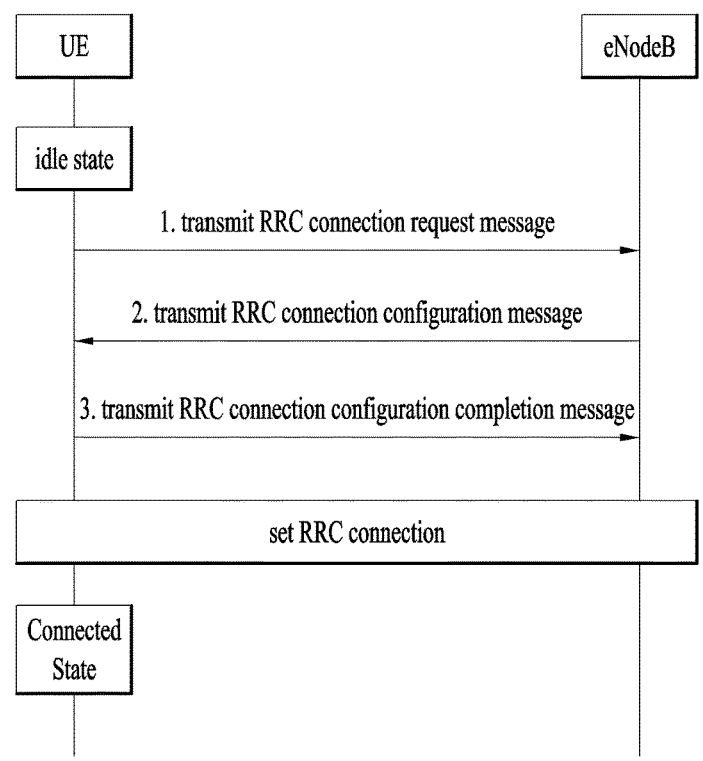
FIG. 6 is a flowchart illustrating a connection procedure in an RRC (radio resource control) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
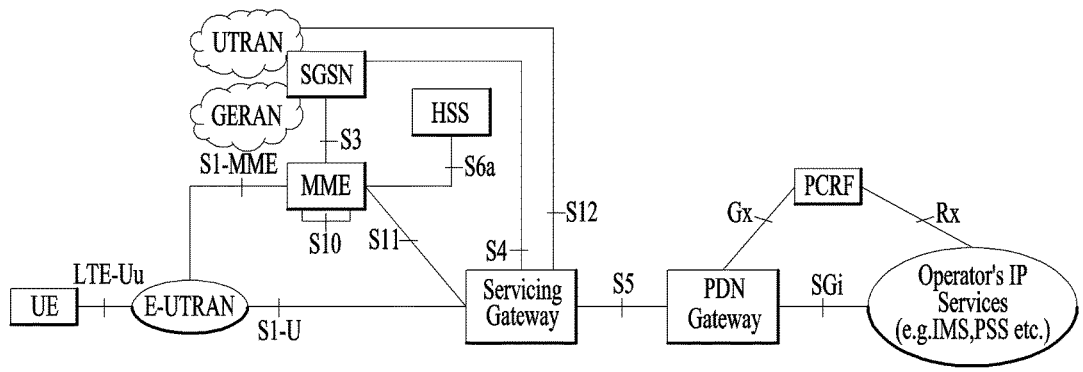
FIGS. 7 to 9 are diagrams for explaining a 3GPP access structure.
Figure 8:
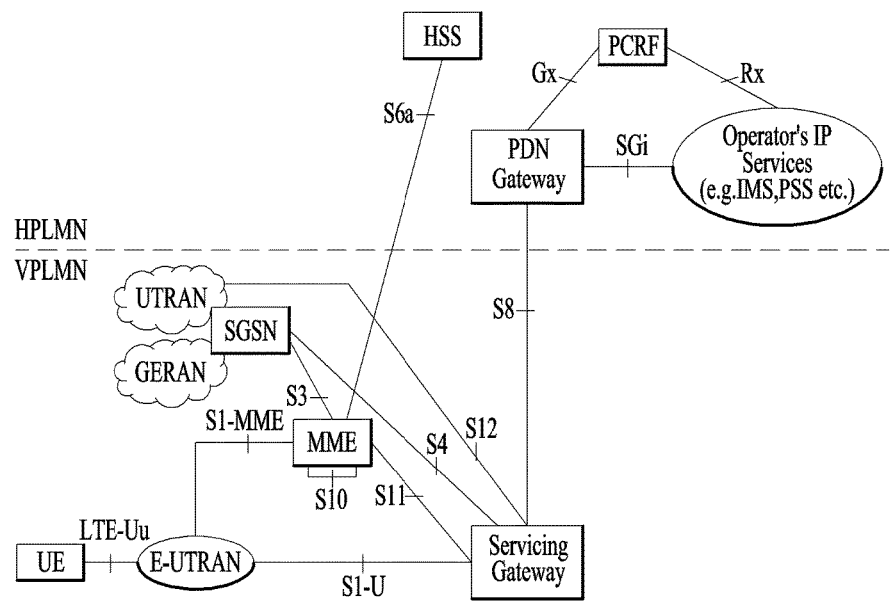
Figure 9:
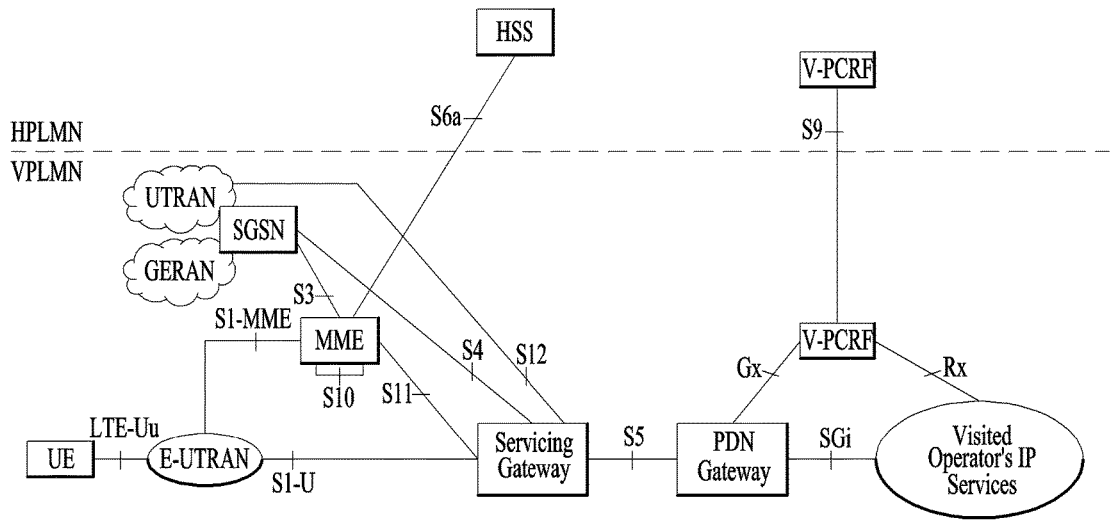

FIGS. 7 to 9 are diagrams for roaming, non-roaming 3GPP access structures. Specifically, FIG. 7 shows architecture for providing a service when a non-roaming UE (i.e., a UE located at a home network) accesses a mobile communication network via 3GPP access (E-UTRAN, UTRAN, or GERAN). FIG. 8 shows architecture for providing a service when a roaming UE (i.e., a UE located at a visited PLMN) accesses a mobile communication network via 3GPP access (E-UTRAN, UTRAN, or GERAN). In particular, FIG. 8 shows architecture for home routed traffic that provides a service via a P-GW located at a home PLMN rather than a P-GW located at a visited PLMN. FIG. 9 shows architecture for providing a service when a roaming UE (i.e., a UE located at a visited PLMN) accesses a mobile communication network via 3GPP access (E-UTRAN, UTRAN, or GERAN). In particular, FIG. 9 shows architecture that traffic, which provides a service via a P-GW located at a visited PLMN, is locally breakout (LBO).

Meanwhile, in order for a UE to receive an IP service, it is necessary for the UE to establish a PDN connection with a network and receive an IP address. For details, it may refer to the paragraphs 5.3.1 IP address allocation, 5.3.2.1 E-UTRAN Initial Attach, and 5.10.2 UE requested PDN connectivity of TS 23.401. This can be inserted to the present specification as related arts.

When a UE capable of performing both IPv4 and IPv6 performs an Attach procedure or a UE requested PDN connectivity procedure, the UE configures IPv4v6 as a PDN type to request PDN connection. Then, a network determines to generate IPv4 PDN, IPv6 PDN, or IPv4v6 PDN based on subscriber information and network configuration. Recently, mobile communication service providers are deploying IPv6 network. Hence, when a UE capable of performing IPv4 and IPv6 configures IPv4v6 as a PDN type and requests PDN connection, IPv6 PDN can be generated. Yet, since there may exist instability in managing IPv6 network compared to IPv4 network of long history, various failure situations such as a failure on an IPv6 network node, a failure on IPv6 routing, and the like may occur. In particular, when a voice service is provided by IMS, it is necessary to manage not only PDN-related network nodes but also various IMS network nodes (e.g., P-CSCF, S-CSCF, I-CSCF, telephony application server, etc.) to provide the service. In this case, due to the instability of the IPv6, possibility of having a failure may increase when interworking is performed on a node or between nodes.

If a failure occurs on IPv6 network, it is necessary to perform a work of sequentially changing PDNs of all users using IPv6 PDN into IPv4 PDN. If a failure occurs at a specific node in a network, since it is able to provide a service via a different node providing the same function in general, the failure problem can be solved by avoiding the failed node only, not using the failed node, or replacing the failed node with a different node. For example, when a mobile communication service provider manages an IMS network, the service provider has a plurality of S-CSCFs. If a failure occurs at a specific S-CSCF, it may be able to provide a service to users, which are used to receive a service from the specific S-CSCF, via a different normally operating S-CSCF. (For details, it may refer to 3GPP TS 23.380 and this can be inserted into the present specification as a related art.)

On the other hand, if a failure occurs at IPv6 network (e.g., a failure occurs on an IP version switching function for interworking between a network managed by IPv6 and a network managed by IPv4, a failure occurs on an IP version switching function for interworking between a device operating by IPv6 and a device operating by IPv4, etc.), since it is unable to process or route an IPv6 packet, unlike a failure on a specific device or a node, it is necessary to change PDNs of all users using IPv6 PDN into IPv4 PDN. When this process is not performed, if a UE, which is not changed to the IPv4 PDN, makes a mobile terminating call or receives a mobile originating call, the UE is unable to process the call or fails to process the call. This may provide a bad experience to a user. In particular, in addition to the sequential change of the PDN or irrespective of the sequential change of the PDN, if a UE has such an occurrence as an MT call (mobile terminating call) or an MO call (mobile originating call), it is necessary to provide a service to the UE irrespective of a failure of IPv6 network. To this end, it is necessary to reconfigure PDN connection providing a connection to IPv4 network, which has no failure, instead of PDN connection providing a connection to the IPv6 network. In particular, it is necessary to have a method of restoring a PDN connection. The PDN connection recovery method is more necessary in a voice service where user experience is seriously considered.

When a failure occurs at a specific PDN connection type (e.g., either IPv4 or IPv6), a method of transmitting and receiving a signal related to PDN connection recovery for promptly and efficiently processing the failure is proposed in the following.

Method of Transmitting and Receiving a Signal Related to PDN Connection Recovery—in the Aspect of HSS If the HSS recognizes that a failure has occurred on PDN connection for APN, the HSS can determine whether to change PDN type-related information of the PDN connection for the APN. If the PDN type-related information is changed, the HSS can transmit the changed PDN type-related information of the PDN connection for the APN to an MME.

As mentioned in the foregoing description, if a failure occurs on IPv6 network (or, IPv4 network), it is necessary to change PDNs of all users using PDN of a PDN type at which the failure has occurred into PDN of a type at which a failure does not occur. If the abovementioned process is in charge of the HSS, it is able to promptly and uniformly perform the process. In particular, the HSS changes PDN type-related information of a PDN connection for a specific APN into a PDN type at which a failure does not occur and transmits the changes PDN type-related information to the MME. In this case, the MME reconfigures the PDN type of the PDN connection of the specific APN according to the received PDN type in accordance with what is defined in the related art. By doing so, the PDN connection related to the failure can be quickly switched or recovered. The PDN type-related information of the PDN connection for the APN may correspond to either a PDN type of PDN connection or a preferred PDN type. It may use information proposed in 3GPP TS 29.272 as the PDN type information. Regarding this, it shall be described in detail later.

Figure 11:
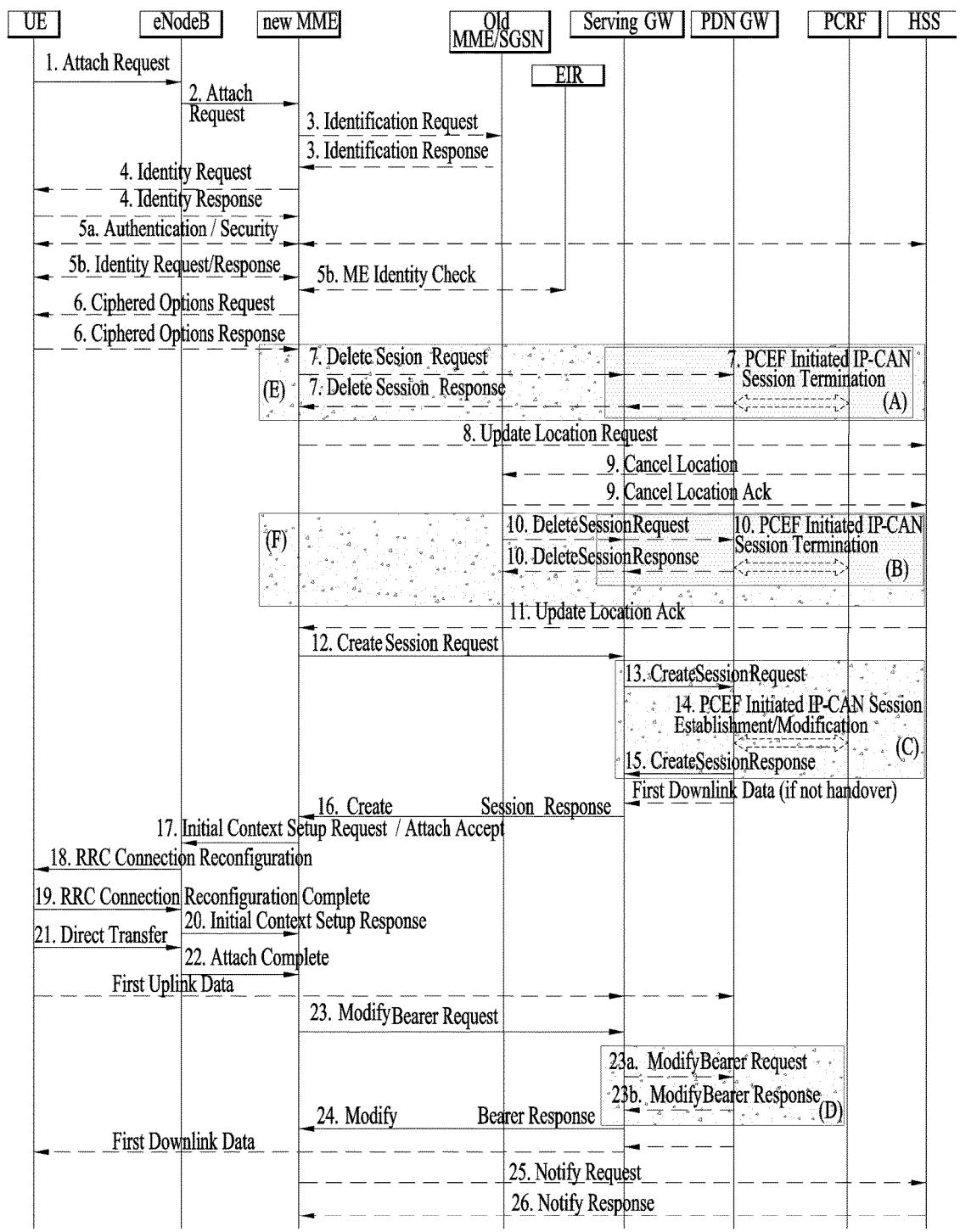

The aforementioned operation of the HSS can be performed after an operation of requesting PDN type-related information of PDN connection for APN to be generated by the HSS. In particular, when a PDN connection is generated or regenerated for a specific APN, it may be able to ask the MME to inform the HSS of the PDN type of the PDN connection. The request can be made via subscriber information provided to the MME by including the request in subscriber information related to the APN (explicitly or implicitly). Or, it may be able to transmit a separate message to the MME. The request of the PDN type-related information can be transmitted to the MME in a manner of being included in Update Location Ack shown in FIG. 11. For detail explanation on each procedure shown in FIG. 11, it may refer to the paragraph 5.3.2.1 (E-UTRAN Initial Attach) of 3GPP TS 23.401v13.2.0.

Figure 12:
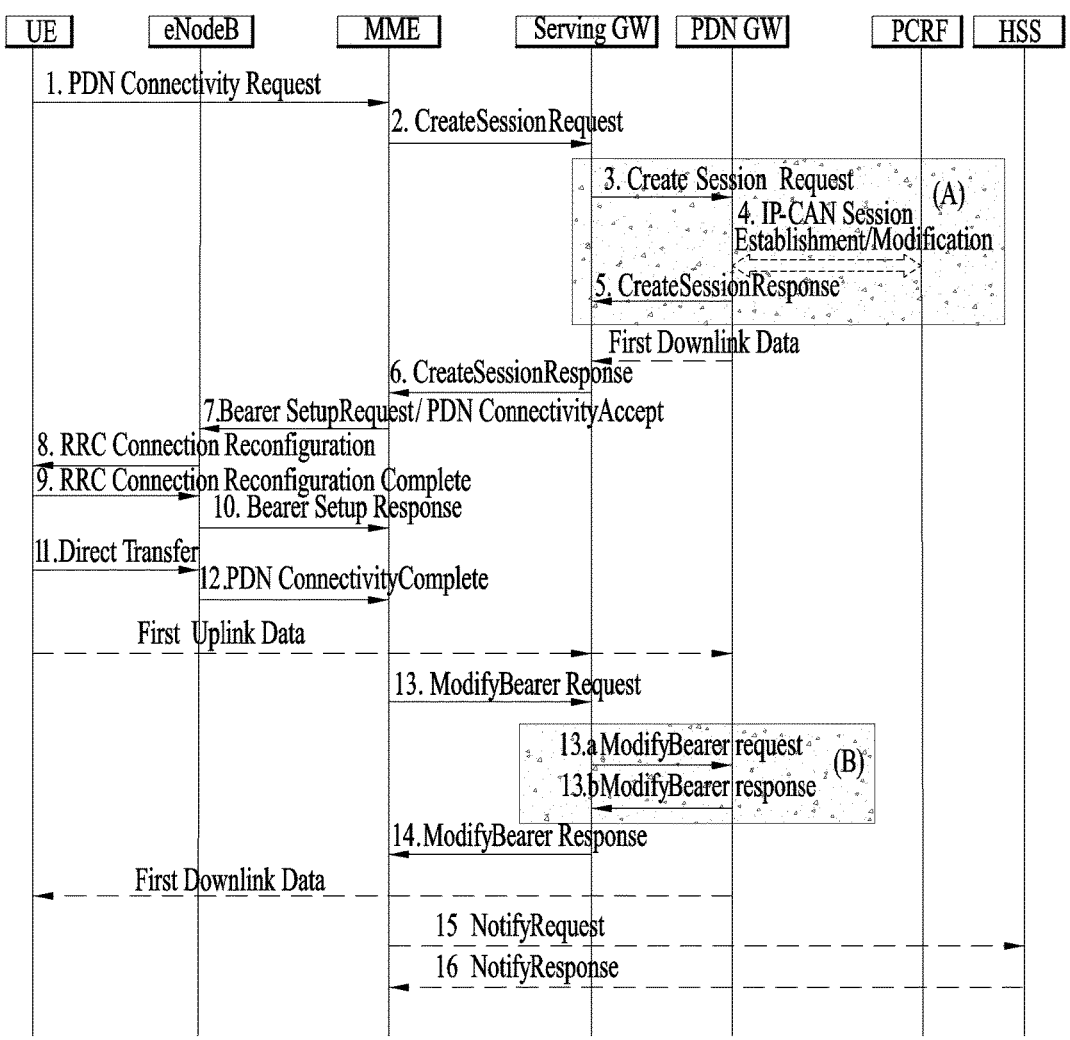

The MME can transmit the PDN type-related information of the PDN connection for the APN to the HSS in response to the request of the HSS. The generated PDN type-related information of the PDN connection for the APN can be included in a notify request. To this end, the notify request message can be extended. Specifically, the MME can inform the HSS of the information after the MME receives a create session response message from an S-GW, by which the present invention may be non-limited. If the MME is aware of the PDN type of the PDN connection, the MME can transmit the information to the HSS at any time. The information can include APN information of the PDN connection. The notify request message can be used in a UE requested PDN connectivity procedure described in FIG. 12. Regarding this, it may refer to the paragraph 5.10.2 (UE requested PDN connectivity) of 3GPP TS 23.401v13.2.0.

Specifically, when a PDN connection is generated/regenerated for an APN#1, the MME informs the HSS of a PDN type of the PDN connection. Or, when PDN connection is generated/regenerated for a specific APN, the HSS requests the MME to inform the HSS of a PDN type of the PDN connection only when the PDN connection is not generated/regenerated by a specific PDN type (or, only when the PDN connection is generated/regenerated by a specific PDN type). For example, the HSS may request the MME to inform the HSS of a PDN type of a PDN connection only when the PDN type is not generated/regenerated by IPv6 type for APN#1. In particular, if the PDN type is generated/regenerated by IPv4 for the APN#1, the MME informs the HSS of the PDN type (explicitly/implicitly).

As a different example, the HSS may request the MME to inform the HSS of a PDN type of a PDN connection only when the PDN type is not generated/regenerated by IPv4 type for APN#2 (or, only when the PDN type is generated/regenerated by IPv6 type). In particular, if the PDN type is generated/regenerated by IPv6 for the APN#2, the MME informs the HSS of the PDN type (explicitly/implicitly).

As a further different example, the HSS may request the MME to inform the HSS of a PDN type of a PDN connection only when the PDN type is not generated/regenerated by IPv6 type for APN#3. In particular, if the PDN type is generated/regenerated by IPv4 or IPv4v6 for the APN#3, the MME informs the HSS of the PDN type (explicitly/implicitly).

The MME can inform the HHS of the PDN type information of the PDN connection only when a UE is roaming. This can be performed on i) all APNs, ii) a specific APN, or iii) a specific PDN type for a specific APN (or, non-specific PDN type).

In order to make the MME inform the HSS of a PDN type only when the PDN type is not generated/regenerated by a specific PDN type (or, only when the PDN type is generated/regenerated by a specific PDN type), preference or dislike for the PDN type of the APN can be used. For example, if preference for the PDN type for APN#1 corresponds to 'IPv6 is preferred' based on subscriber information or separate information, the MME informs the HSS of a PDN type only when PDN connection for the APN is not generated/regenerated by IPv6 type (or, only when the PDN connection for the APN is generated/regenerated by IPv4 type). As a different example, if dislike for the PDN type for APN#2 corresponds to 'IPv4 is dislike' based on subscriber information or separate information, the MME informs the HSS of a PDN type only when PDN connection for the APN is not generated/regenerated by IPv6 type (or, only when the PDN connection for the APN is generated/regenerated by IPv4 type). As a further different example, if preference for the PDN type for APN#3 corresponds to 'IPv6 is preferred' based on subscriber information or separate information, the MME informs the HSS of a PDN type only when PDN connection for the APN is generated/regenerated by IPv4 type or IPv4v6.

Although the PDN type of the PDN connection is transmitted to the HSS based on the request of the HSS, it can also be performed based on the configuration configured in the MME. As a different example, if a PDN type for APN of subscriber information permits one type only (e.g., IPv4 or IPv6), it may be able to configure the MME not to transmit the PDN type-related information to the HSS (explicitly or implicitly). Or, the MME can autonomously determine not to transmit the information. If it is assumed that the MME is changed, the request information can be forwarded to a new MME. The new MME may receive the request information from the HSS or the old MME (as a UE context or separate information).

The HSS can store information on a PDN type preferred for a PDN-related context and information on a PDN type of a formed PDN connection (e.g., one of IPv4, IPv6, and IPv4v6) in subscribed information. The information on the preferred PDN type may indicate one of IPv4, IPv6, and IPv4v6 or may indicate that there is no preference.

Subsequently, PDN connection recovery can be determined by receiving a related message from a different network node. For example, if the HSS receives location info deregistration due to the occurrence of MO call (mobile originating call), the HSS can determine to perform PDN connection recovery on a UE, which has generated the MO call. Or, if the HSS receives location info deregistration due to the occurrence of MT call (mobile terminating call), the HSS can determine to perform PDN connection recovery on a UE corresponding to a target of the MT call. In this case, it may be able to achieve an effect that PDN connection recovery is preferentially performed on 'UE' related to MT call or MO call at which a failure has occurred or 'PDN connection for APN'.

The HSS can change a PDN type of PDN connection for APN in the subscriber information after PDN connection failure is recognized. In this case, the APN may correspond to an APN related to IPv4 or IP v6 at which a failure has occurred. For example, when a failure occurs on IPv6 network of an APN for an IMS voice service (or IMS or MMTel) and it is necessary to connect PDN to IPv4 network to provide a service, if a PDN type for the APN corresponds to one of IPv6, IPv4v6, and IPv4_OR_IPv6, a changed value may correspond to IPv4. PDN type information belongs to APN-Configuration among subscriber information in 3GPP TS 29.272 and may correspond to IPv4 (0), IPv6 (1), IPv4v6 (2), IPv4_ORIPv6 (3).

As mentioned in the foregoing description, the PDN type-related information changed by the HSS may correspond to a preferred PDN type. In this case, the HSS changes a PDN type of the APN in the subscriber information and/or configures/changes preference or dislike for the PDN type of the APN instead of changing the PDN type of the APN. In case of a scheme of configuring/changing preference, the PDN type-related information can be changed by one selected from the group consisting of information indicating that IPv4 is preferred, information indicating that IPv6 is preferred, information indicating that there is no preference between IPv4 and IPv6 (this can be represented as there is no preference configuration information), and information indicating that both IPv4 and IPv6 are preferred (this can be represented as there is no preference configuration information). Or, in case of a scheme of configuring/changing dislike, the PDN type-related information can be changed by one selected from the group consisting of information indicating that IPv4 is dislike, information indicating that IPv6 is dislike, information indicating that there is no dislike between IPv4 and IPv6 (this can be represented as there is no dislike configuration information), and information indicating that both IPv4 and IPv6 are dislike (this can be represented as there is no preference configuration information). For example, if a PDN type for APN#1 corresponds to either IPv4v6 or IPv4_OR IPv6, preference for the PDN type can be configured by information indicating that the IPv4 is preferred. When a PDN type is preferred, it may indicate that the PDN type is preferentially used when PDN is configured or PDN is configured using the preferred PDN type only. As a different example, if a PDN type for APN#1 corresponds to either IPv4v6 or IPv4_OR_IPv6, dislike for the PDN type can be configured by information indicating that the IPv6 is dislike. When a PDN type is dislike, it may indicate that the PDN type is avoided when PDN is configured or PDN is configured using not dislike PDN type only among available PDN types. The preferred scheme and the dislike scheme can be used in a manner of being mixed. For example, if a PDN type for APN#1 corresponds to either IPv4v6 or IPv4_OR_IPv6, dislike for the PDN type can be configured by information indicating that the IPv6 is dislike, while preference for the PDN type is configured by information indicating that the IPv4 is preferred.

In order for the HSS to determine whether to change a PDN type for the APN and whether to configure/change preference (or dislike) for the PDN type of the APN, the HSS can use one or more methods described in the following.

First of all, The HSS can utilize the PDN type information obtained from the MME and the information indicating that the MME does not transmit the PDN type information. If a PDN type of PDN connection generated/regenerated for APN#1 of a UE#1 corresponds to IPv4 type and the MME informs the HSS of the PDN type, although the HSS recognizes that MT call (mobile terminating call) or an MO call (mobile originating call) occurs at the UE#1, the HSS can determine not to change/configure the PDN type. Or, when a PDN type of PDN connection generated/regenerated for APN#1 of a UE#2 corresponds to IPv6 type, if the MME does not inform the HSS of the PDN type and the HSS recognizes that MT call (mobile terminating call) or an MO call (mobile originating call) occurs at the UE#2, the HSS can determine to change/configure the PDN type.

Second, The HSS can utilize the IP type information of a UE intending to register at an IMS network obtained from the S-CSCF. In relation to this, if information related to the operation of the S-CSCF is received from the S-CSCF, the HSS can store the IP type information in APN-related UE context for connecting to the IMS network (or APN for receiving IMS service). The HSS can deduct a PDN type of PDN connection, which is generated for the UE to receive IMS service, from the type information of the IP address registered at the IMS network by the UE. If the S-CSCF informs the HSS that a type of an IMS network registration IP address of UE#1 corresponds to IPv4 type, since the PDN type of the PDN connection generated/regenerated for the APN#1 corresponds to the IPv4 type, although the HSS recognizes that MT call (mobile terminating call) or an MO call (mobile originating call) occurs at the UE#1, the HSS can determine not to change/configure the PDN type. Or, when the S-CSCF informs the HSS that a type of an IMS network registration IP address of UE#2 corresponds to IPv6 type, since the PDN type of the PDN connection generated/regenerated for the APN#1 corresponds to the IPv6 type, if the HSS recognizes that MT call (mobile terminating call) or an MO call (mobile originating call) occurs at the UE#2, the HSS can determine to change/configure the PDN type.

Third, the HSS can utilize IP type information of a UE intending to register at an IMS network obtained from the I-CSCF. In relation to this, if information related to an operation of the I-CSCF is received from the I-CSCF, the HSS can store the IP type information in APN-related UE context for connecting to the IMS network (or APN for receiving IMS service). The HSS can deduct a PDN type of PDN connection, which is generated for the UE to receive IMS service, from the type information of the IP address registered at the IMS network by the UE. If the I-CSCF informs the HSS that a type of an IMS network registration IP address of UE#1 corresponds to IPv4 type, since the PDN type of the PDN connection generated/regenerated for the APN#1 corresponds to the IPv4 type, although the HSS recognizes that MT call (mobile terminating call) or an MO call (mobile originating call) occurs at the UE#1, the HSS can determine not to change/configure the PDN type. Or, when the I-CSCF informs the HSS that a type of an IMS network registration IP address of UE#2 corresponds to IPv6 type, since the PDN type of the PDN connection generated/regenerated for the APN#1 corresponds to the IPv6 type, if the HSS recognizes that MT call (mobile terminating call) or an MO call (mobile originating call) occurs at the UE#2, the HSS can determine to change/configure the PDN type.

Figure 10:
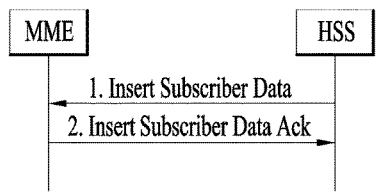
FIGS. 10 to 13 are flowcharts for explaining various embodiments of the present invention.

The HSS transmits a message to an MME to indicate that the PDN type of the APN is changed in subscriber information. To this end, the HSS may utilize a legacy message or a new message defined for the present invention. For example, in case of utilizing an insert subscriber data message shown in FIG. 10 as a legacy message, one or more information described in the following can be additionally included in the message together with information on the changed PDN type of the APN. a) Information indicating that the PDN type has changed (indication or flag), b) Information indicating that it is necessary to form a PDN again using the changed PDN type for the APN, c) Information indicating that a problem/failure has occurred on a previously configured PDN connection (or PDN type of APN), d) Information indicating that it is necessary to perform PDN connection restoration on APN, and e) PDN type-related preference/dislike information of APN. For detail explanation on each procedure shown in FIG. 10, it may refer to 3GPP TS 23.401, explanation on FIG. 5.3.9.2-1.

As mentioned in the foregoing description, the HSS may be able to transmit a message including one or more information described in the b), c), d) and e) instead of transmitting the message indicating that the PDN type for the APN has changed in the subscriber information to the MME. When the HSS transmits the message, the message can include additional information on application timing described in the following. i) Information indicating that a change included in the message is immediately applied, ii) information indicating that a change included in the message is applied when a UE is idle (or the UE becomes idle), and iii) information indicating that a change included in the message is applied when a next PDN connection for a corresponding APN is configured (for example, when a PDN is configured by turning on power of the UE after the power of the UE is turned off). For example, if the HSS recognizes that an MT call (mobile terminating call) or an MO call (mobile originating call) occurs at a UE and performs the present operation, since it is necessary to provide a service as soon as possible, the HSS includes the i) information indicating that a change included in the message is immediately applied.

Method of Transmitting and Receiving a Signal Related to PDN Connection Recovery—in the Aspect of MME If the MME receives PDN type-related information on a changed APN from the HSS, which has recognized a failure on the PDN connection, the MME can reconfigure PDN connection corresponding to the PDN type-related information on the changed APN. This is because, since the previously configured PDN type of the PDN is not permitted anymore, the MME reconfigures the PDN with a PDN type permitted for providing a service to the APN. If the PDN type of the previously configured PDN corresponds to an already permitted (preferred or dislike) PDN type, it is not necessary for the MME to perform the PDN reconfiguration operation.

If the PDN connection to be reconfigured is not the last PDN connection, the MME performs an MME requested PDN disconnection procedure. In this case, in order to reconfigure the PDN connection to be connected to the same APN, when the MME transmits a NAS message to a UE, the MME includes request for reactivation of the same PDN connection via the same APN information in the NAS message. For details, it may refer to the MME requested PDN disconnection procedure mentioned earlier in the paragraph 5.10.3 UE or MME requested PDN disconnection of 3GPP TS 23.401.

If the PDN connection to be reconfigured corresponds to the last PDN connection, the MME performs an MME-initiated detach procedure. In this case, in order to make the UE re-attach after detach, the detach procedure is performed by setting a detach type to re-attach. For details, it may refer to the contents mentioned earlier in the paragraph 5.3.8.3 MME-initiated detach procedure of 3GPP TS 23.401. If a PDN connection, which is generated by the UE as an attach procedure after re-attach, is not the PDN connection for the APN to be reconfigured and the UE does not make an additional request for connecting a PDN connection for the APN after the attach, the MME may initiate the PDN connection procedure for the APN to be reconfigured or may transmit a request for initiating the procedure to the UE. Or, when the detach procedure is performed, the MME transmits information on the APN to be reconfigured to the UE to make the UE configure the PDN connection for the APN as an attach procedure or make the UE request the PDN connection for the APN to be immediately configured after the attach procedure. If the PDN connection to be reconfigured corresponds to the last PDN connection, it may consider a method that the UE performs a PDN disconnection with reactivation operation while maintaining attach while the MME does not performs the detach procedure.

If the MME receives a message including one or more information described in the b), c), d) and e) instead of a message indicating that subscriber information has changed, the MME sets a PDN type to be reconfigured to a create session request message, which is transmitted to S-GW/P-GW, and transmits the create session request message in the course of reconfiguring a PDN connection. For example, if it is necessary to cancel IPv6 PDN connection and configure IPv4 PDN connection, the MME sets the PDN type included in the create session request message to IPv4 and then transmits the create session request message to the S-GW.

When the HSS transmits the message to the MME, if the message includes information on application timing, the MME performs a PDN reconfiguration operation on a corresponding APN. In particular, if i) 'immediate application' is included in the message, the PDN reconfiguration operation is immediately performed. If ii) 'apply when idle mode' is included in the message, the PDN reconfiguration operation is performed when a UE is in an idle mode or the UE is switched to the idle mode. If iii) 'apply when next PDN is configured' is included in the message, the MME performs an operation of configuring PDN using a PDN type which is permitted (preferred or dislike) when a next PDN configuration occurs. If the information on the application timing is not included in the message, the MME can use one of i), ii), and iii) based on information such as local configuration and/or operator policy, and the like.

If a PDN connection reconfiguration procedure is associated with roaming, it may apply following description. In case of local breakout roaming, P-GW of VPLMN and/or P-CSCF may not support the changed PDN type. For example, when a failure occurs on an IMS voice service-related IPv6 network of HPLMN, if it intends to provide a service via IPv4 connection, the P-GW of VPLMN and/or the P-CSCG roamed by the UE may not support the IPv4. In case of a roaming UE, the MME selects a P-GW located at VPLMN instead of a P-GW located at HPLMN to configure a PDN connection for a specific APN. This is because a VPLMN address allowed flag for the APN is set to the subscriber information (specifically, VPLMN address allowed information belonging to APN-configuration among the subscriber information of TS 29.272).

In order to solve the aforementioned problem, when the MME selects a P-GW for a PDN connection, it may be able to make the MME select a P-GW located at HPLMN instead of a P-GW located at VPLMN. In particular, it may be able to make the MME select home routed instead of LBO. This can be performed in a manner of combining one or more references/operations described in the following with each other.

i) When the MME cancels a previous PDN connection and reconfigures a PDN connection using a changed PDN type, the MME always selects the P-GW located at HPLMN. Or, if it is determined as it is difficult to support a PDN connection using the changed PDN type in VPLMN, the MME selects the P-GW located at HPLMN.

ii) Information indicating that the MME may ignore or override VPLMN address allowed flag is added to the subscriber information. If the VPLMN address allowed flag is set (i.e., allowed), the MME generally selects the P-GW located at VPLMN. If not, the MME may select the P-GW located at HPLMN.

iii) When the HSS transmits the message indicating that the PDN-related information is changed, if the VPLMN address allowed flag is previously set (i.e., allowed) to the subscriber information, the MME transmits the message without setting the flag (i.e., not allowed). In addition, it may include information indicating that the VPLMN address allowed flag has changed. The MME selects the P-GW located at HPLMN while reconfiguring the PDN connection using the changed PDN type.

iv) When the VPLMN address allowed flag is set to the subscriber information on the APN to be reconfigured, if a P-GW and/or P-CSCF, which is located at a network to which the MME belongs thereto, is unable to support a PDN type to be reconfigured, the MME informs the HSS that the P-GW and/or P-CSCF is unable to support the PDN type. Then, the HSS makes a respond to the MME while not setting the VPLMN address allowed flag to the APN. Or, the HSS makes a respond to the MME while including information indicating that the MME may ignore or override the VPLMN address allowed flag. The MME selects the P-GW located at HPLMN while reconfiguring the PDN connection using the changed PDN type.

Method of Transmitting and Receiving a Signal Related to PDN Connection Recovery—in the Aspect of CSCF First of all, when an S-CSCF transmits an S-CSCF registration notification request message to a HSS according to a registration operation of a UE, the S-CSCF includes type information (IPv4 or IPv6) of an IP address at which the UE intends to registers in the S-CSCF registration notification request message.

For the S-CSCF registration notification request message, it may refer to the paragraph 6.1.2 S-CSCF registration/deregistration notification of 3GPP TS 29.228. For a diameter command corresponding to the S-CSCF registration notification request message, it may refer to the paragraph 6.1.3 Server-Assignment-Request (SAR) Command of 3GPP TS 29.229 and the paragraph 6.1.7 Multi-media-Auth-Request (MAR) Command of TS 29.229.

In order to include the type information of the IP address in the S-CSCF registration notification request message, it may use a legacy IE (information element) in a manner of extending the legacy IE or it may be able to define a new IE. For example, the type information of the IP address at which the UE intends to register can be obtained via an IP address of a contact header part of an SIP REGISTER message, which is transmitted by the UE via an IMS network. This is applied throughout the present invention. Whenever the UE changes and registers an IP address or an IP address type, the S-CSCF transmits a message to the HSS to inform the HSS of the change. To this end, it may be able to use a legacy message or a new message.

When an I-CSCF transmits a user registration status query message to a HSS according to a registration operation of a UE, the I-CSCF includes type information (IPv4 or IPv6) of an IP address at which the UE intends to registers in the user registration status query message.

For the user registration status query message, it may refer to the paragraph 6.1.1 User registration status query of 3GPP TS 29.228. For a diameter command corresponding to the user registration status query message, it may refer to the paragraph 6.1.1 User-Authorization-Request (UAR) Command of 3GPP TS 29.229. In order to include the type information of the IP address in the user registration status query message, it may use a legacy IE (information element) in a manner of extending the legacy IE or it may be able to define a new IE.

If a failure is recovered, it may change the aforementioned PDN type-related information, deliver the information to the MME, and perform an operation of the MME. In this case, it may not include information indicating that a problem/failure has occurred on a previously configured PDN connection (or a PDN type of the APN). Instead, it may include information indicating that a problem/failure of the PDN type of the APN is recovered. When the HSS transmits the message to the MME, if the message additionally includes information on application timing, since a PDN type at which a failure occurs (i.e., a not used network) is recovered, it may be able to continuously use a previously used PDN connection with no problem. Hence, it may be able to include 'iii) apply when next PDN is configured' in the message.

Although the aforementioned description is explained centering on the IPv6 network, by which the present invention may be non-limited. The description can also be applied to a case that a failure occurs on IPv4 network. And, the method proposed by the present invention is not restricted to a failure of a network that provides a voice service. The method can also be used for solving a general IP network failure. And, a PDN connection restoration method proposed by the present invention can be applied not only to an IP network failure case but also to a case of reconfiguring a PDN connection due to various reasons such as load distribution, network management, and the like.

Example of Transmitting and Receiving a Signal of Each Node Related to PDN Connection Restoration In the following, a method of transmitting and receiving a signal related to PDN connection restoration of each network node is explained with reference to FIG. 13.

Figure 13:
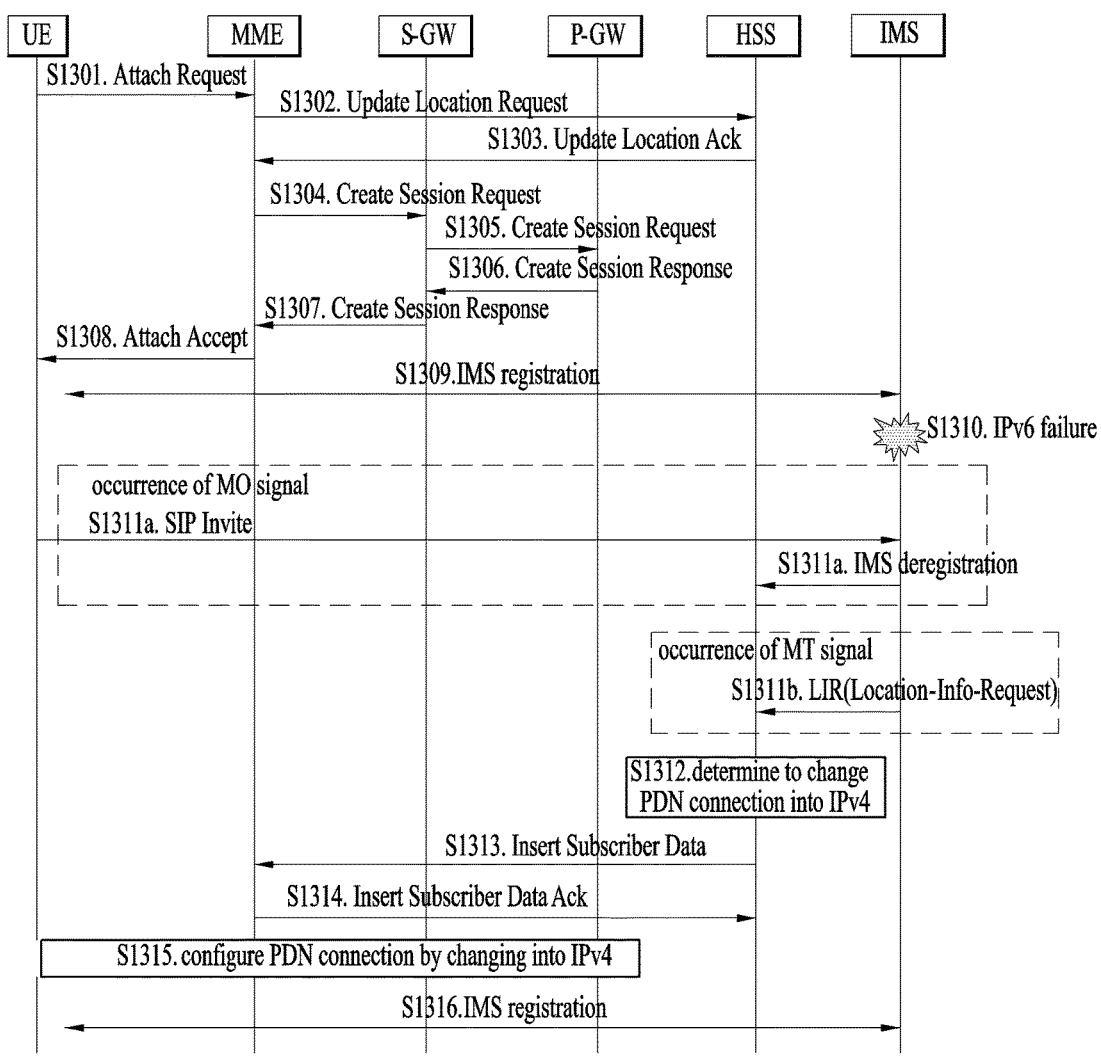

Referring to FIG. 13, in the step S1301, a UE transmits an attach request message to an MME. In the step S1302, the MME transmits an update location request message to an HSS. In the step S1303, the HSS transmits an update location Ack message including subscriber information on a UE to the MME. In this case, as mentioned earlier in the "method of transmitting and receiving a signal related to PDN connection recovery—in the aspect of HSS", when a PDN connection is generated/regenerated to a specific APN, the HSS can include information for asking the MME to inform the HSS of a PDN type of the PDN connection in the message. In the present embodiment, 'IPv6 is preferred' (PDN connection type-related information) for an APN (or IMS well-known APN) for an IMS service (or MMTel service) is included in the message. By doing so, it may be able to make the MME inform the HSS of the PDN type only when a PDN connection for the APN is not generated/regenerated by IPv6 type (or, only when the PDN connection for the APN is generated/regenerated by IPv4 type). For reference, assume that subscriber information allows both IPv4 and IPv6 as a PDN type permitted to the APN. In the step S1304, the MME transmits a create session request message to the S-GW. The create session request message includes APN information (i.e., APN for IMS service) of a PDN connection to be generated, a PDN type, and related information. In the step S1305, the S-GW transmits the create session request message to the P-GW. In the step S1306, the P-GW determines to generate a PDN connection for an APN (or IMS well-known APN) via IPv6. Subsequently, the P-GW transmits a create session response message including information on the PDN connection to the S-GW. In the step S1307, the S-GW transmits the create session response message to the MME. In the step S1308, the MME transmits an attach accept message to the UE. For reference, since the generated PDN connection is generated by a preferred PDN type, it is not necessary for the MME to inform the HSS of the PDN type information. In particular, the HSS can recognize that the PDN connection for the APN is generated via IPv6. In the step S1309, the UE registers at an IMS network.

In the step S1310, a failure is recognized on the IPv6 network. Hence, it may be able to sequentially change IPv6 PDN connection into IPv4 PDN connection for the subscriber having the IPv6 PDN connection. In this case, changing to the IPv4 PDN connection can be preferentially performed on UEs at which a failure has occurred. In the step S1311, if a UE generates a MO (mobile originating) call, the step S1311a is performed. If a MT (mobile terminating) call is generated in the UE, the step S1311b is performed. As shown in the step S1311a, if the UE generates the MO call, the HSS can recognize the MO call. Or, as shown in the step S1311b, if the MT call is generated in the UE, the HSS can recognize the MT call. In this case, changing to the IPv4 PDN connection can be preferentially performed on the UE at which the MT call is generated or UEs at which the MO call is generated.

In the step S1312, the HSS determines to change the PDN connection via IPv4. In the step S1313, the HSS transmits an insert subscriber data message to the MME to indicate that the PDN type for the APN is changed to be allowed for IPv4 only from the PDN type allowed for both IPv4 and IPv6. In the step S1314, the MME transmits an insert subscriber data Ack message to the HSS in response to the insert subscriber data message. In the step S1315, the MME performs an operation of reconfiguring the PDN connection for the APN via IPv4. For details, it may refer to the "method of transmitting and receiving a signal related to PDN connection recovery—in the aspect of MME". In the present embodiment, assume that there is a different PDN connection in addition to the PDN connection to be changed via the IPv4. In particular, after the UE is detached, a procedure of reestablishing the PDN connection to be changed via the IPv4 is performed instead of attaching the UE again. In particular, it may start from the step 2 of the paragraph 5.10.3 (UE or MME requested PDN disconnection) of TS 23.401.

In the step S1313, if the HSS includes information indicating that 'IPv6 is preferred' for the APN together with the information indicating that IPv4 is allowed for the PDN type for the APN only, the MME can inform the HSS that the PDN connection is formed via IPv4 after the PDN connection is configured. Or, the HSS may store the PDN connection formed via IPv4 for the APN formed by the UE.

In the step S1316, since the UE has obtained IPv4 address as a result of the PDN connection configuration, the UE registers at an IMS network. Subsequently, it may be able to provide a normal service to the UE.

In FIG. 13, a failure occurs on IPv6 network and a PDN connection to be changed to IPv4 is generated in an attach procedure. Unlikely, the PDN connection can also be generated via a UE requested PDN connectivity procedure after attach.

Figure 14:
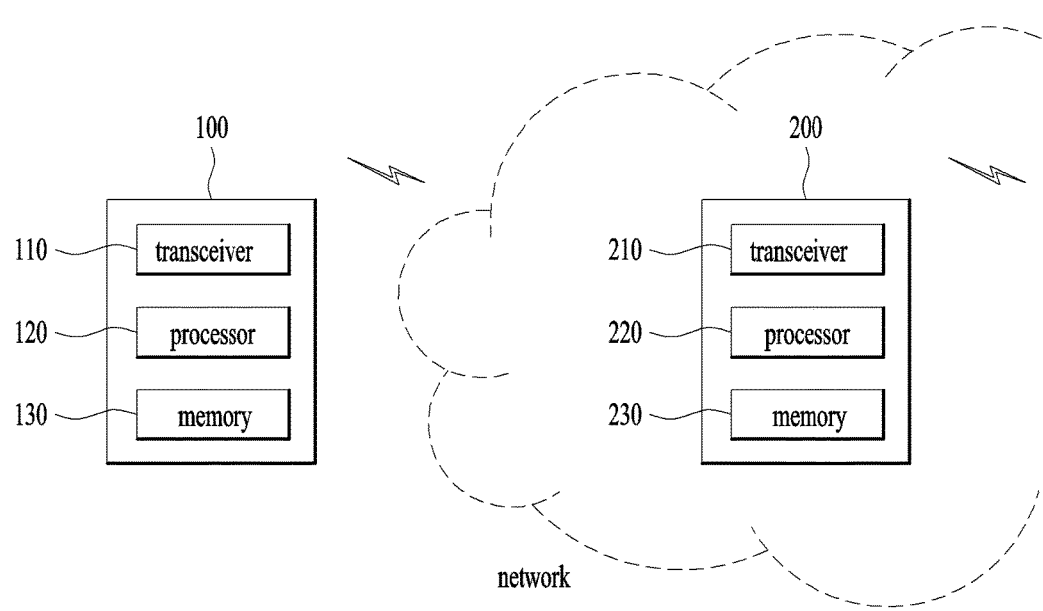
FIG. 14 is a diagram illustrating a configuration of a node according to embodiment of the present invention.

FIG. 14 illustrates configurations of a UE and a network node according to an embodiment of the present invention.

Referring to FIG. 14, a UE 100 according to the present invention may include a transceiver 110, a processor 120 and a memory 130. The transceiver 110 can be configured to transmit signals, data and information to an external device and receive signals, data and information from the external device. The UE 100 can be connected to the external device in a wired or wireless manner. The processor 120 can control overall operation of the UE 100 and can be configured to process information transmitted/received between the UE 100 and the external device. In addition, the processor 120 can be configured to perform UE operation proposed by the present invention. The memory 130 can store processed information for a predetermined time and can be replaced with a configuration element such as a buffer (not shown).

Referring to FIG. 14, a network node 200 according to the present invention may include a transceiver 210, a processor 220 and a memory 230. The transceiver 210 can be configured to transmit signals, data and information to an external device and to receive signals, data and information from the external device. The network node 200 can be connected to the external device in a wired or wireless manner. The processor 220 can control overall operation of the network node 200 and can be configured to process information transmitted/received between the network node 200 and the external device. In addition, the processor 220 can be configured to perform network node operation proposed by the present invention. The memory 230 can store processed information for a predetermined time and can be replaced with a configuration element such as a buffer (not shown).

The aforementioned UE 100 and network node 200 may be implemented such that the above-described various embodiments of the present invention are independently applied or two or more thereof are simultaneously applied, and description of redundant parts is omitted for clarity.

The embodiments of the present invention can be achieved by various means, for example, hardware, firmware, software, or a combination thereof.

In a hardware configuration, the embodiments of the present invention can be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned various embodiments of the present invention are described with reference to examples applied to 3GPP LTE system, it can be applied to various kinds of wireless communication systems as well as the 3GPP LTE system.

What is claimed is:

1. A method of transmitting and receiving a signal related to PDN (Packet Data Network) connection recovery, which is transmitted and received by a HSS (Home Subscriber Server) in a wireless communication system, the method comprising:
    recognizing, by the HSS, a failure occurred at a PDN connection for an APN (Access Point Name);
    determining, by the HSS, whether to change PDN type-related information of the PDN connection for the APN, based on a type of an IP (internet protocol) address registered in an IMS (IP Multimedia Subsystem) network;
    transmitting to an MME (Mobility Management Entity), by the HSS, information on a reconfiguration operation of the PDN connection; and
    if the PDN type-related information is changed, transmitting the changed PDN type-related information of the PDN connection for the APN to the MME.

2. The method of claim 1, further comprising:
    requesting, by the HSS, PDN type-related information of a PDN connection for an APN to be generated.

3. The method of claim 2, wherein the request of the PDN type-related information is transmitted to the MME in a manner of being included in Update Location Ack.

4. The method of claim 2, further comprising:
    receiving the generated PDN type-related information of the PDN connection for the APN from the MME.

5. The method of claim 4, wherein the generated PDN type-related information of the PDN connection for the APN is contained in a Notify request.

6. The method of claim 1, wherein the PDN type-related information of the PDN connection for the APN corresponds to either a PDN type of PDN connection or a preferred PDN type.

7. The method of claim 1, wherein if IMS deregistration is received due to an occurrence of an MO (mobile originating) call, the HSS determines to recover the PDN connection for a UE, which has generated the MO call.

8. The method of clam 1, wherein if a Location info request is received due to an occurrence of an MT (mobile terminating) call, the HSS determines to recover the PDN connection for a UE corresponding to a target of the MT call.

9. The method of claim 1, wherein if the PDN type of the PDN connection for the APN at which the failure occurs corresponds to IPv6, the changed PDN type of the PDN connection for the APN corresponds to IPv4.

10. A method of transmitting and receiving a signal related to PDN (Packet Data Network) connection recovery, which is transmitted and received by an MME (Mobility Management Entity) in a wireless communication system, the method comprising:
    receiving changed PDN type-related information of a PDN connection for an APN (Access Point Name) and receiving information on a reconfiguration operation, from a HSS (Home Subscriber Server), which has recognized a failure occurred at the PDN connection for the APN; and
    reconfiguring a PDN connection corresponding to the changed PDN type-related information of the PDN connection of the APN, when the information on the reconfiguration operation is associated with an idle mode of a UE (user equipment) and the UE is in the idle mode.

11. The method of claim 10, wherein if the reconfigured PDN connection corresponds to a last PDN connection, the MME performs an MME-initiated Detach procedure.

12. The method of claim 11, wherein the MME-initiated Detach procedure indicates the UE is to perform a re-attach after a detach is performed.

13. The method of claim 10, wherein if the reconfigured PDN connection does not correspond to a last PDN connection, the MME performs an MME requested PDN disconnection procedure.

14. The method of claim 13, wherein the MME requested PDN disconnection procedure asks the UE to reactivate a PDN connection for the same APN after PDN disconnection is performed.

* * * * *